No. 773,027. PATENTED OCT. 25, 1904.
L. C. & F. R. PECK.
HAND TRUCK.
APPLICATION FILED FEB. 26, 1904.
NO MODEL.

WITNESSES:

INVENTORS
Louis C. Peck
Fred R. Peck
BY
ATTORNEYS

No. 773,027.

Patented October 25, 1904.

UNITED STATES PATENT OFFICE.

LOUIS C. PECK AND FRED R. PECK, OF BERLIN, WISCONSIN.

HAND-TRUCK.

SPECIFICATION forming part of Letters Patent No. 773,027, dated October 25, 1904.

Application filed February 26, 1904. Serial No. 195,394. (No model.)

*To all whom it may concern:*

Be it known that we, LOUIS C. PECK and FRED R. PECK, citizens of the United States, residing at Berlin, county of Green Lake, and State of Wisconsin, have invented new and useful Improvements in Hand-Trucks, of which the following is a specification.

Our invention relates to improvements in hand-trucks for moving barrels, boxes, kegs, &c.; and it pertains to the peculiar construction by which the same when adjusted to any given article is adapted to pick up, carry, and set down such article quickly and easily without the necessity of the user tilting such article by hand preparatory to placing it upon or removing it from the truck.

Our truck is especially adapted to be used in handling nail-kegs, beer-barrels, and similar packages when shipped in car-load lots, in which case when adjusted to fit one of such articles it can thereafter be used for handling any number of such articles without readjustment and is attached to such article simply by first bringing the lower end of the truck in contact with the side of the same at its lower end, when by moving the operating-handle of the truck forwardly it is caused to automatically engage the chime of the barrel or keg, when by moving the handle of the truck backwardly the package is raised from the floor and supported by the truck until conveyed to the place of deposit, when it is again released from the truck by simply throwing the upper end of the handle of the truck forwardly and disengaging the same from the chime.

The construction of our invention is explained by reference to the accompanying drawings, in which—

Figure 1:
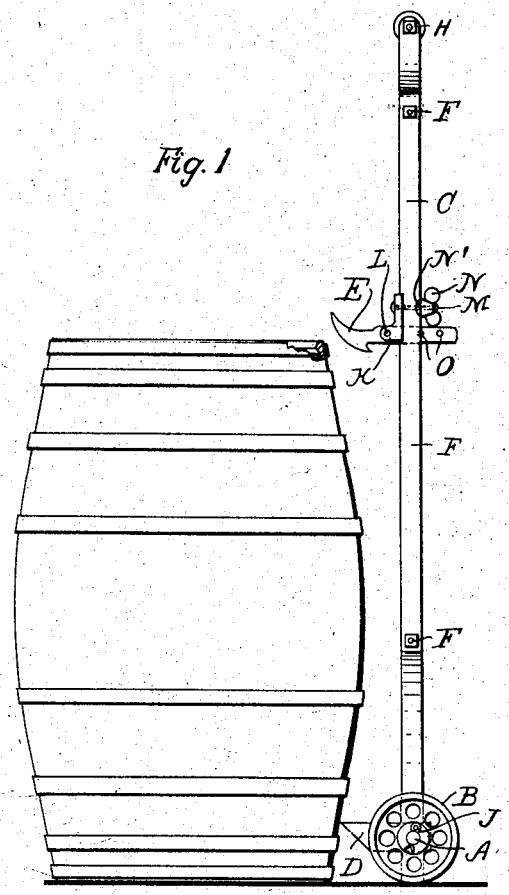
Figure 2:
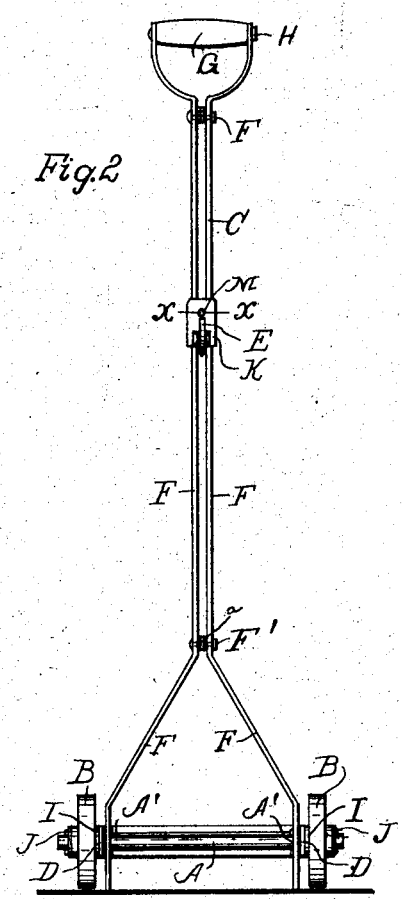
Figure 3:
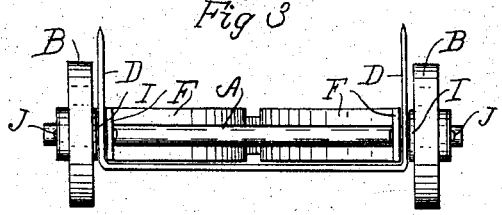
Figure 4:
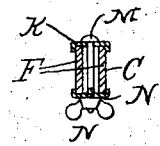

Figure 1 represents a side view of our device as adjusted preparatory to picking up and moving a barrel. Fig. 2 represents a front view thereof. Fig. 3 represents a bottom view. Fig. 4 is a section drawn on line *x x* of Fig. 2.

Like parts are identified by the same reference-letters throughout the several views.

Our truck comprises, among other things, the axle A, axle-supporting wheels B, operating-lever C, truck-supporting brackets D D, and an adjustable package-engaging hook E. The lever C is formed of two separate bars F F, which are secured together by one or more bolts or rivets F' and held apart with intermediate blocks *a*. The upper ends of the bars F are curved outwardly for the reception of the handle G, which is supported by and between them upon the bolt H. The bars F F extend below the axle and are adapted when brought to the vertical to engage the floor and prevent the truck from moving backward as the load is placed upon it and are provided with apertures at A' for the reception of the axle A. The supporting-brackets D are preferably formed integrally from a single piece of metal, and they are also provided with apertures for the reception of the axle A, and both said lever and brackets are secured upon the axle, said brackets being preferably interposed between the lower ends of the bars F and the hubs I of the wheels. The wheels B are retained on the axles by the pins J. The upper ends of the brackets D are preferably pointed, as shown in Fig. 1, so as to engage the side of the package. The hook E is connected to the adjustable bracket K by the pivotal bolt L, and the bracket K is adjustably secured to the lever C by the bolt M and the hand-nut N.

N' is a plate interposed between the hand-nut N and the edge of the bars F.

The shank of the hook E is provided with a plurality of apertures O for the reception of the bolt L, whereby said hook is adapted to be adjusted nearer to or farther from the operating-handle, as may be required to adapt it to barrels with staves of different curvature or to various other packages, while said hook is adjusted longitudinally of the lever to conform to the different heights of barrels or other packages by changing the position of the adjustable bracket K. When desirous to change the position of the bracket K, it is necessary to loosen the hand-nut N on the bolt M, when the same may be moved upwardly or downwardly to any desired position and locked in place by turning down said nut N upon its supporting-bolt. Thus it is obvious that when the hook E has been once adjusted longitudinally and vertically, so as to properly engage the barrel or other package, it is necessary in handling such package to simply bring the lower end of the truck against the side of the barrel or other package, as shown in Fig. 1, and to incline the lever C toward the same, when, in case the package is a barrel, the hook E engages the chime, when by drawing backwardly upon the upper end of the lever said barrel will be brought to the proper position upon the truck to be handled, the hook E being preferably so adjusted as to retain the convex side of the barrel when loaded upon the truck in contact with the operating-lever. It will also be understood that when the barrel or other package has been removed it may be unloaded from the truck by simply inclining the lever C forwardly again until the lower end of the barrel or other package rests upon the floor, when the truck is disengaged therefrom by simply raising the hook E out of engagement with the package.

It will be obvious that by curving the lower ends of the bars comprising the operating-lever outwardly, as shown in Fig. 2, they perform the function of braces between the lever and the axle with which they are connected.

Having thus described our invention, what we claim as new, and desire to secure by Letters Patent, is—

1. A hand-truck comprising an operating-lever formed of two separate bars; means for securing said bars having their lower ends curved outwardly forming braces and axle-supporting bearings together; an axle and axle-supporting wheels connected with the lower diverging ends of said bars; a pair of brackets supported from said axle and lever and means for engaging a package and holding the same in place upon said brackets and against said operating-lever, substantially as set forth.

2. A hand-truck comprising an operating-lever formed of two separate bars; means for securing said bars together, said bars having their upper ends curved outwardly forming handle-supporting arms and their lower ends curved outwardly forming axle-supporting bearings; a handle secured to the outwardly-curved ends of said bars; an axle supported at its ends in said axle-bearings; axle-supporting wheels secured upon the ends of said axle; package-supporting brackets connected with said axle and operating-lever and means for engaging a package and holding it in place upon said brackets against said operating-lever, substantially as specified.

3. A hand-truck comprising an operating-lever formed of two separate bars centrally secured together by a plurality of bolts; an axle and axle-supporting wheels connected with the lower diverging ends of said bars; a handle connected with the upper diverging ends of said bars; a pair of brackets supported from said axle; a package-retaining hook pivotally supported from said operating-lever from an adjustable bracket; means for adjustably securing said bracket and hook to the side of said operating-lever, whereby the same is adapted to be adjusted to engage and hold packages of different sizes and shapes upon the supporting-brackets of the truck, substantially as specified.

4. A hand-truck comprising an operating-lever formed of two separate bars centrally secured together by a plurality of bolts; an axle and axle-supporting wheels connected with the lower diverging ends of said bars; a handle connected with the upper diverging ends of said bars; a pair of brackets formed integrally from a single piece of metal; supported from said axle; a package-retaining hook pivotally supported from said operating-lever from an adjustable bracket; means for adjustably securing said bracket and hook to the side of said operating-lever, whereby the same is adapted to be adjusted to engage and hold packages of different sizes and shapes upon the supporting-brackets of the truck, substantially as specified.

In testimony whereof we affix our signatures in the presence of two witnesses.

LOUIS C. PECK.
FRED R. PECK.

Witnesses:
HENRY O. HAUER,
C. W. MARSH.